(12) United States Patent
Kim

(10) Patent No.: US 7,180,563 B2
(45) Date of Patent: Feb. 20, 2007

(54) ARRAY SUBSTRATE AND FABRICATION METHOD FOR IN-PLANE SWITCHING MODE LIQUID CRYSTAL DISPLAY DEVICE HAVING PIXEL ELECTRODE OVERLAPPING COMMON LINE AND ADJACENT GATE LINE

(75) Inventor: Gi-Hong Kim, Annyang-si (KR)

(73) Assignee: LG.Philips Co., Ltd., Seoul (KR)

( * ) Notice: Subject to any disclaimer, the term of this patent is extended or adjusted under 35 U.S.C. 154(b) by 0 days.

(21) Appl. No.: 10/151,314

(22) Filed: May 21, 2002

(65) Prior Publication Data

US 2002/0171796 A1 Nov. 21, 2002

(30) Foreign Application Priority Data

May 21, 2001 (KR) ................ 2001-27612

(51) Int. Cl.
*G02F 1/1343* (2006.01)
*G02F 1/1333* (2006.01)

(52) U.S. Cl. .................. 349/141; 349/39; 349/138
(58) Field of Classification Search ............. 349/122, 349/138, 141, 39
See application file for complete search history.

(56) References Cited

U.S. PATENT DOCUMENTS 5,477,355 A * 12/1995 Sasaki et al. ............... 349/42

(Continued)

FOREIGN PATENT DOCUMENTS

| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In-Plane Switching of Nematic Liquid Crystals"; Japan Display '92; pp. 547-550.
M. Oh-e, et al.; "Principles and Characteristics of Electro-Optical Behaviour with In-Plane Switching Mode"; Asia Display '95; pp. 577-580.
M. Ohta et al.; "Development of Super-TFT-LCDs with In-Plane Switching Display Mode"; Asia Display '95; pp. 707-710.

(Continued)

*Primary Examiner*—Andrew Schechter
(74) *Attorney, Agent, or Firm*—McKenna Long & Aldridge LLP

(57) ABSTRACT

An array substrate for an in-plane switching mode liquid crystal display device include: a substrate; a gate line on the substrate; a common line on the substrate, the common line being parallel to and spaced apart from the gate line; a common electrode on the substrate. The common electrode includes: a plurality of vertical portions perpendicularly extended from the common line; and a horizontal portion combining the plurality of vertical portions. A gate insulating layer is provided on the gate line, the common line and the common electrode. A data line is provided on the gate insulating layer. A thin film transistor is connected to the gate line and the data line, the thin film transistor including an active layer, source and drain electrodes. A pixel electrode is provided on the gate insulating layer. The pixel electrode includes: an extended portion extended from the drain electrode; a plurality of vertical portions perpendicularly extended from the extended portion; and a horizontal portion combining the plurality of vertical portions and overlapping the common line and the gate line.

17 Claims, 5 Drawing Sheets

U.S. PATENT DOCUMENTS

| | | | |
|---|---|---|---|
| 5,598,285 A | | 1/1997 | Kondo et al. .................. 349/39 |
| 5,796,449 A | * | 8/1998 | Song ........................... 349/54 |
| 5,838,037 A | | 11/1998 | Masutani et al. ........... 257/296 |
| 5,946,060 A | | 8/1999 | Nishiki et al. ................ 349/48 |
| 5,990,987 A | | 11/1999 | Tanaka ........................ 349/43 |
| 6,028,653 A | | 2/2000 | Nishida ...................... 349/141 |
| 6,057,896 A | * | 5/2000 | Rho et al. ..................... 349/42 |
| 6,097,454 A | | 8/2000 | Zhang et al. ................. 349/43 |
| 6,133,977 A | * | 10/2000 | Lee et al. ................... 349/141 |
| 6,188,452 B1 | * | 2/2001 | Kim et al. .................... 349/43 |
| 6,208,399 B1 | * | 3/2001 | Ohta et al. .................. 349/139 |
| 6,297,867 B1 | * | 10/2001 | Miyahara et al. ........... 349/141 |

OTHER PUBLICATIONS

S. Matsumoto et al.; Display Characteristics of In-Plane Switching (IPS) LCDs and a Wide-Veiwing-Angle 14.5- in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

* cited by examiner

ARRAY SUBSTRATE AND FABRICATION METHOD FOR IN-PLANE SWITCHING MODE LIQUID CRYSTAL DISPLAY DEVICE HAVING PIXEL ELECTRODE OVERLAPPING COMMON LINE AND ADJACENT GATE LINE

This application claims the benefit of Korean Patent Application No. 2001-27612, filed on May 21, 2001, which is hereby incorporated by reference for all purposes as if fully set forth herein.

BACKGROUND OF THE INVENTION

1. Field of the Invention

The present invention relates to a liquid crystal display (LCD) device, and more particularly to an in-plane switching (IPS) mode LCD device and a fabricating method thereof.

2. Discussion of the Related Art

Generally, a conventional liquid crystal display (LCD) device uses optical anisotropy and polarization properties of liquid crystal (LC) molecules. The LC molecules have a definite orientational order in alignment resulting from their thin and long shapes. The alignment direction of the LC molecules can be controlled by applying an electric field to the LC molecules. In other words, as the alignment direction of the electric field is changed, the alignment of the LC molecules also changes. Since the incident light is refracted to the orientation of the LC molecules due to the optical anisotropy of the aligned LC molecules, images are displayed.

Of the different types of known LCDs, active matrix LCDs (AM-LCDs), which have thin film transistors and pixel electrodes arranged in a matrix form, are the subject of significant research and development because of their high resolution and superiority in displaying moving images.

FIG. 1 is a schematic plan view of an array substrate for a conventional IPS mode LCD device.

In FIG. 1, a gate line 12 and a common line 16 are disposed on a substrate 10 and spaced apart from each other. A data line 24 that defines a pixel region "P" with the gate line 12 crosses the gate line 12 and the common line 16. A thin film transistor "T" including a gate electrode 14, an active layer 20, source and drain electrodes 26 and 28 is disposed at a crossing of the gate line 12 and the data line 24. The gate electrode 14 is connected to the gate line 12 and the source electrode 26 is connected to the data line 24.

A pixel electrode 30 connected to the drain electrode 28 and a common electrode 17 connected to the common line 16 are disposed at the pixel region "P." The pixel electrode 30 is composed of an extended portion 30a, a plurality of vertical portions 30b and a horizontal portion 30c. The extended portion 30a is extended from the drain electrode 28. The plurality of vertical portions 30b are extended from the extended portion 30a and spaced apart from each other. The horizontal portion 30c combines the plurality of vertical portions 30b. On the other hand, the common electrode 17 is composed of a horizontal portion 17a and a plurality of vertical portions 17b. The horizontal portion 17a combines the plurality of vertical portions 17b. The plurality of vertical portions 17b extended from the common line 16 are alternately disposed with the plurality of vertical portions 30b and spaced apart from the data line 24.

Furthermore, a storage capacitor "C" is disposed adjacent to the pixel region "P." The storage capacitor "C" includes the gate line 12 and the common line 16 as a first storage electrode, and a transparent electrode 36 as a second storage electrode. A gate insulating layer and a passivation layer having a low dielectric constant (not shown) are interposed between the first and second storage electrodes.

FIGS. 2A to 2D are schematic cross-sectional views taken along a line II—II of FIG. 1, which show a fabricating process of an array substrate for a conventional IPS mode LCD device.

In FIG. 2A, after one of the conductive metal group including aluminum (Al), aluminum alloy such as aluminum neodymium (AlNd), chromium (Cr), molybdenum (Mo) and tungsten (W) is deposited on a substrate 10, a gate line 12 including a gate electrode 14, a common line 16 spaced apart from the gate line 12 and a common electrode 17 (of FIG. 1) including a horizontal portion 17a and a plurality of vertical portions 17b (of FIG. 1) are formed through a first mask process. The plurality of vertical portions 17b (of FIG. 1) are perpendicularly extended from the common line 16 and the horizontal portions 17a combines the plurality of vertical portions 17b (of FIG. 1). Next, a gate insulating layer 18 is formed on an entire surface of the substrate 10 by depositing one of the inorganic insulating material group including silicon nitride (SiNx) and silicon oxide (SiO$_2$). After an amorphous silicon (a-Si:H) and an impurity-doped amorphous silicon (n+a-Si:H) are deposited on the gate insulator 18, an active layer 20 and an ohmic contact layer 22 of an island shape are formed through a second mask process.

In FIG. 2B, after one of the conductive metal group including aluminum (Al), aluminum alloy such as aluminum neodymium (AlNd), chromium (Cr), molybdenum (Mo) and tungsten (W) is deposited on an entire surface of the substrate 10, a data line 24 defining a pixel region "P" with the gate line 12, source and drain electrodes 26 and 28 spaced apart from each other, and a pixel electrode 30 including an extended portion 30a (of FIG. 1), a plurality of vertical portions 30b and a horizontal portion 30c are formed through a third mask process. The horizontal portion 30c overlaps the common line 16 partially. The active layer 20 between the source and drain electrodes 26 and 28 is exposed through etching the ohmic contact layer 22 by using the source and drain electrodes 26 and 28 as a mask.

In FIG. 2C, after one of the organic insulating material group including benzocyclobutene (BCB) and acrylic resin is deposited on an entire surface of the substrate 10, a passivation layer 32 having a contact hole 34 exposing the horizontal portion 30c is formed through a fourth mask process.

In FIG. 2D, after one of the transparent conductive metal group including indium tin oxide (ITO) and indium zinc oxide (IZO) is deposited on an entire surface of the substrate 10, a transparent electrode 36 contacting the horizontal portion 30c through the contact hole 34 is formed over the gate line 12 and the common line 16 through a fifth mask process. Both the gate line 12 and the common line 16 function as a first storage electrode of a storage capacitor "C" and the transparent electrode 36 functions as a second storage electrode of the storage capacitor "C."

In the structure of FIG. 1, since the data line 24 and the adjacent vertical portion 17b are spaced apart from each other, liquid crystal molecules between the data line 24 and the adjacent vertical portion 17b are undesirably aligned due to signal interference between the common line 17 and the data line 24 so that light leakage phenomenon can occur. Accordingly, the display quality of a liquid crystal panel is deteriorated.

Moreover, the horizontal portion 30c only partially overlaps the common line 16, and the additional transparent electrode 36 is formed over the gate line 12 and the common line 16 to form the storage capacitor "C." The horizontal portion 30c is not extended over the entire common line 16 and the gate line 12 because the gate insulating layer of SiNx or $SiO_2$ cannot prevent signal interference between the horizontal portion 30c and the common and gate lines 16 and 12. If the horizontal portion 30c is extended over the common line 16 and the gate line 12, signals of the common line 16 and the gate line 12 may influence the pixel electrode 30 (of FIG. 1) through the horizontal portion 30c. Therefore, the overlapping portion between the first horizontal portion 30c and the common line 16 should be minimized.

However, the capacitance of the storage capacitor "C" also decreases according to the minimization of the overlapping portion. To solve this problem, the additional transparent electrode 36 connected to the horizontal portion 30c is formed over the common line 16 and the gate line 12. Accordingly, the area of the storage capacitor "C" increases so that enough capacitance can be obtained. Furthermore, since the transparent electrode 36 is electrically connected to the pixel electrode 30 (of FIG. 1), the transparent electrode 36 can be used as a pad when the TFT characteristics are inspected. However, fabrication cost increases and production yield decreases due to the additional process for the transparent electrode 36.

SUMMARY OF THE INVENTION

Accordingly, the present invention is directed to a liquid crystal display device that substantially obviates one or more of problems due to limitations and disadvantages of the related art.

An advantage of the present invention is to provide an array substrate for an in-plane switching mode liquid crystal display device, where the fabrication cost decreases and production yield increases due to an improved structure.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching mode liquid crystal display device includes: a substrate; a gate line on the substrate; a common line on the substrate, the common line being parallel to and spaced apart from the gate line; a common electrode oil the substrate, the common electrode including: a plurality of first vertical portions perpendicularly extended from the common line; and a first horizontal portion combining the plurality of first vertical portions; a gate insulating layer on the gate line, the common line and the common electrode; a data line on the gate insulating layer; a thin film transistor connected to the gate line and the data line, the thin film transistor including an active layer, source and drain electrodes; and a pixel electrode on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and the gate line.

In another aspect, a fabricating method of an array substrate for an inplane switching mode liquid crystal display device includes: forming a gate line on a substrate; forming a common line on the substrate, the common line being parallel to and spaced apart from the gate line; forming a common electrode on the substrate, the common electrode including: a plurality of first vertical portions perpendicularly extended from the common line; and a first horizontal portion combining the plurality of first vertical portions; forming a gate insulating layer on the gate line, the common line and the common electrode; forming a data line on the gate insulating layer; forming a thin film transistor connected to the gate line and the data line, the thin film transistor including an active layer, source and drain electrodes; and forming a pixel electrode on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and the gate line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 3:
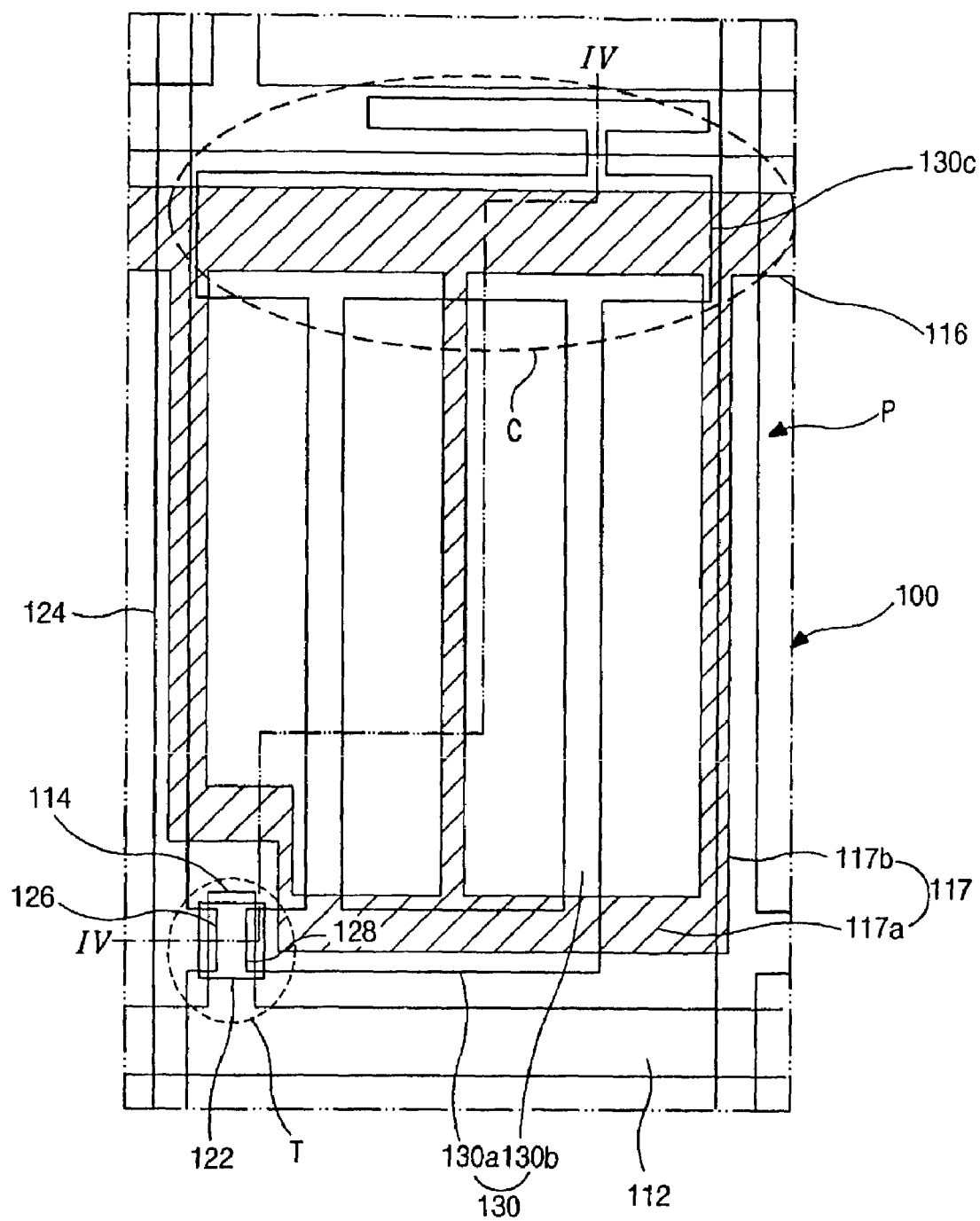
FIG. 3 is a schematic plan view of an array substrate for an IPS mode LCD device according to an embodiment of the present invention.

FIG. 3 is a schematic plan view of an array substrate for an IPS mode LCD device according to an embodiment of the present invention.

In FIG. 3, a gate line 112 and a common line 116 are disposed on a substrate 100 and spaced apart from each other. A data line 124 that defines a pixel region "P" with the gate line 112 crosses the gate line 112 and the common line 116. A thin film transistor "T" including a gate electrode 114, an active layer 122, source and drain electrodes 126 and 128 is disposed at a cross of the gate line 112 and the data line 124. The gate electrode 114 is connected to the gate line 112 and the source electrode 126 is connected to the data line 124.

At the pixel region "P," a pixel electrode 130 connected to the drain electrode 128 and a common electrode 117 connected to the common line 116 are disposed. The pixel electrode 130 is composed of an extended portion 130a, a plurality of vertical portions 130b and a horizontal portion 130c. The extended portion 130a is extended from the drain electrode 128. The plurality of vertical portions 130b are extended from the extended portion 130a and spaced apart from each other. The horizontal portion 130c combining the plurality of vertical portions 130b is extended so that the horizontal portion 130c can overlap both the common line 116 and the gate line 112. On the other hand, the common electrode 117 is composed of a horizontal portion 117a and a plurality of vertical portions 117b. The horizontal portion 117a combines the plurality of vertical portions 117b. The plurality of vertical portions 117b extended from the common line 116 are alternately disposed with the plurality of vertical portions 130b and spaced apart form the data line 124. The vertical portion 117b adjacent to the data line 124 overlaps the data line 124 so that light leakage phenomenon between the data line and the common electrode can be prevented and the display quality can be improved.

Furthermore, a storage capacitor "C" is disposed adjacent to the pixel region "P." The storage capacitor "C" includes the gate line 112 and the common line 116 as a first storage electrode, and the horizontal portion 130c as a second storage electrode. A gate insulating layer (not shown) having a low dielectric constant (less than about 3) is interposed between the first and second storage electrodes.

Figure 4A:
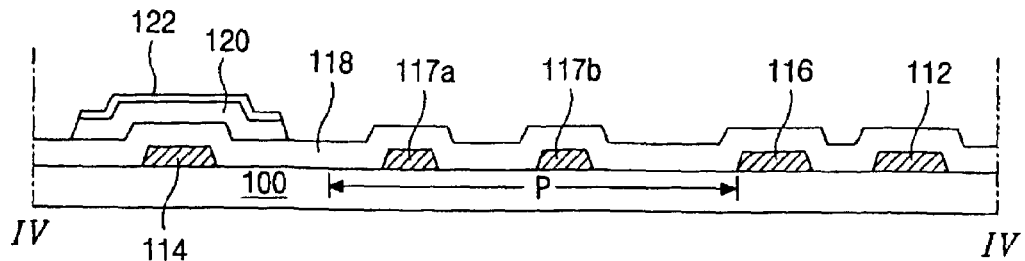
FIGS. 4A to 4C are schematic cross-sectional views taken along a line IV—IV of FIG. 3, which show a fabricating process of an array substrate for an IPS mode LCD device according to an embodiment of the present invention.
Figure 4B:
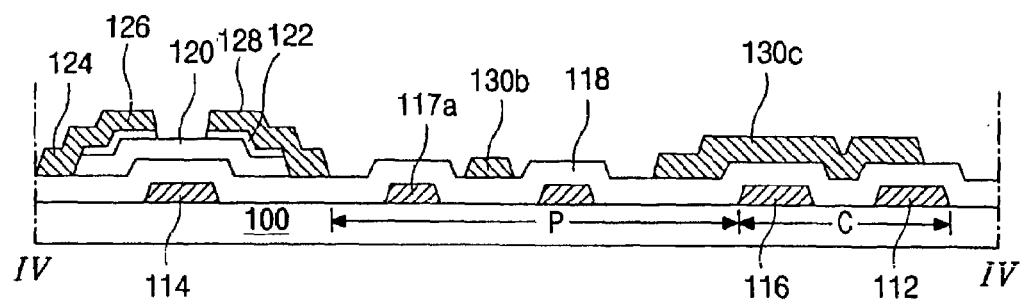
Figure 4C:
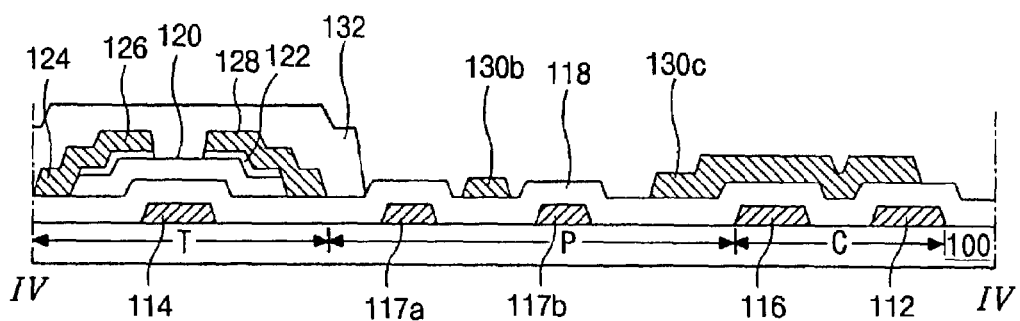

FIGS. 4A to 4C are schematic cross-sectional views taken along a line IV—IV of FIG. 3, which show a fabricating process of an array substrate for an IPS mode LCD device according to an embodiment of the present invention.

In FIG. 4A, after one of the conductive metal group including aluminum (Al), aluminum alloy such as aluminum neodymium (AlNd), chromium (Cr), molybdenum (Mo) and tungsten (W) is deposited on a substrate 100, a gate line 112 including a gate electrode 114, a common line 116 spaced apart from the gate line 112 and a common electrode 117 (of FIG. 3) including a horizontal portion 117a and a plurality of vertical portions 117b are formed through a first mask process. The plurality of vertical portions 117b are perpendicularly extended from the common line 116 and the horizontal portions 117a combines the plurality of vertical portions 117b. Next, a gate insulating layer 118 is formed on an entire surface of the substrate 100 by depositing one of the organic insulating material group including benzocyclobutene (BCB) and acrylic resin. After an amorphous silicon (a-Si:H) and an impurity-doped amorphous silicon (n+a-Si:H) are deposited on the gate insulator 118, an active layer 120 and an ohmic contact layer 122 of an island shape are formed through a second mask process.

In FIG. 4B, after one of the conductive metal group including aluminum (Al), aluminum alloy such as aluminum neodymium (AlNd), chromium (Cr), molybdenum (Mo) and tungsten (W) is deposited on an entire surface of the substrate 100, a data line 124 defining a pixel region "P" with the gate line 112, source and drain electrodes 126 and 128 spaced apart from each other, and a pixel electrode 130 including an extended portion 130a (of FIG. 3), a plurality of vertical portions 130b and a horizontal portion 130c are formed through a third mask process. The horizontal portion 130c is extended so that the horizontal portion 130c can overlap both the common line 116 and the gate line 112. The active layer 120 between the source and drain electrodes 126 and 128 is exposed through etching the ohmic contact layer 122 by using the source and drain electrodes 126 and 128 as a mask.

In FIG. 4C, after one of the organic insulating material group including benzocyclobutene (BCB) and acrylic resin and inorganic insulating material group including silicon nitride (SiNx) and silicon oxide ($SiO_2$) is deposited on an entire surface of the substrate 100, a passivation layer 132 is formed through a fourth mask process. Since the passivation layer covers only a thin film transistor (TFT) "T," the pixel electrode 130 (of FIG. 3) of the pixel region "P" is exposed.

Figure 1:
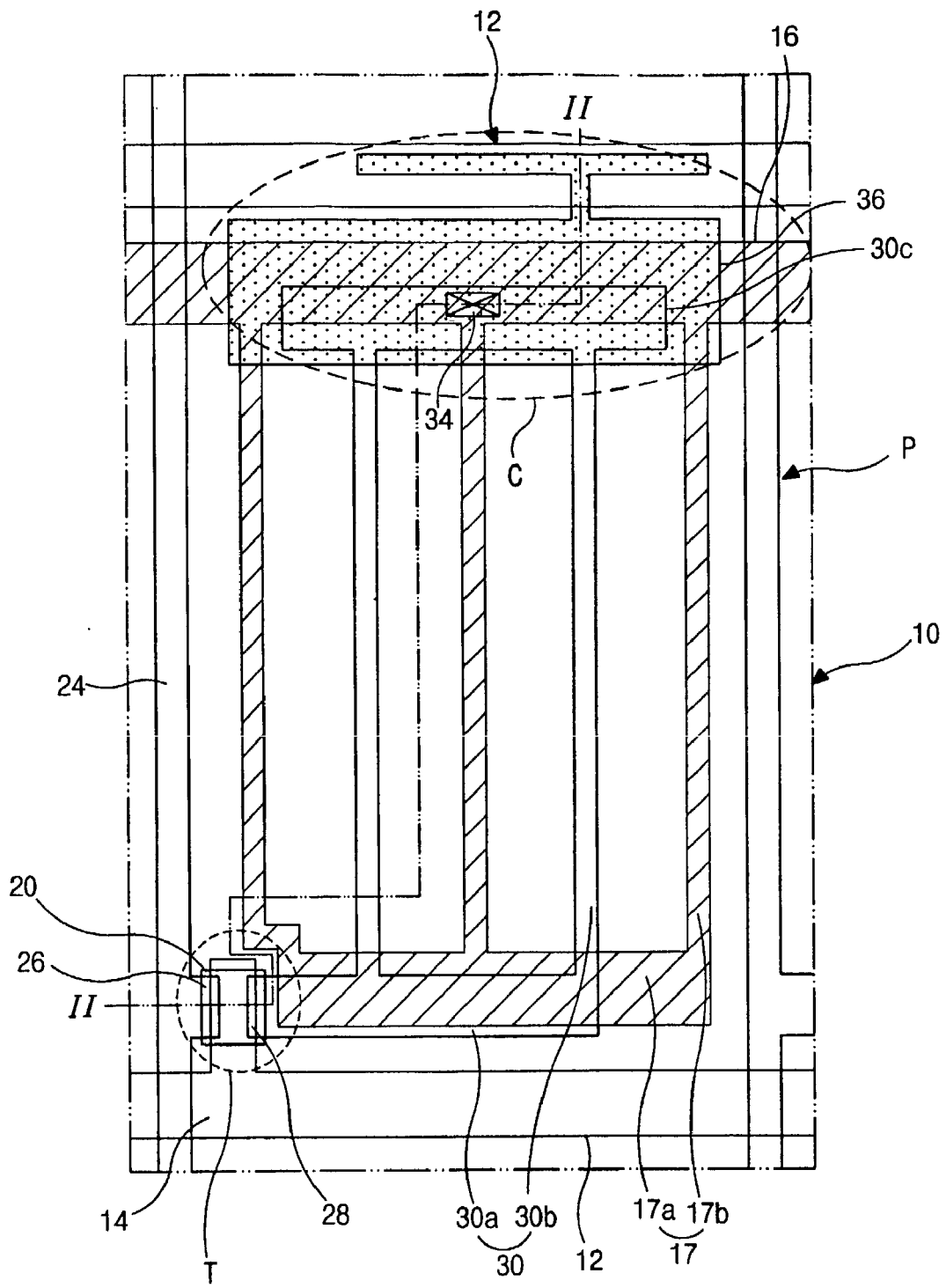
FIG. 1 is a schematic plan view of an array substrate for a conventional IPS mode LCD device.
Figure 2A:
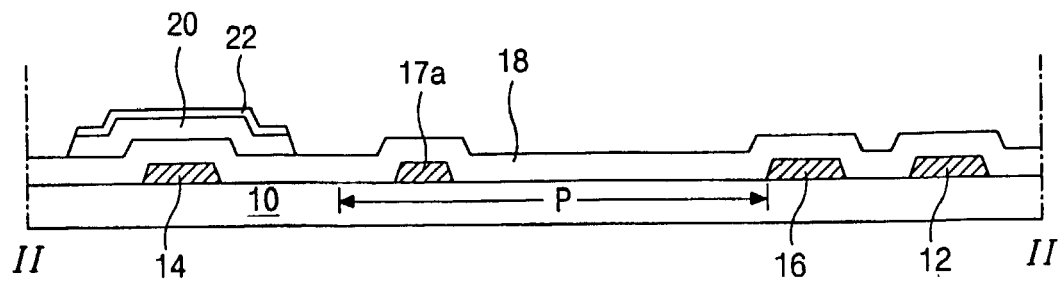
FIGS. 2A to 2D are schematic cross-sectional views taken along a line II—II of FIG. 1, which show a fabricating process of an array substrate for a conventional IPS mode LCD device.
Figure 2B:
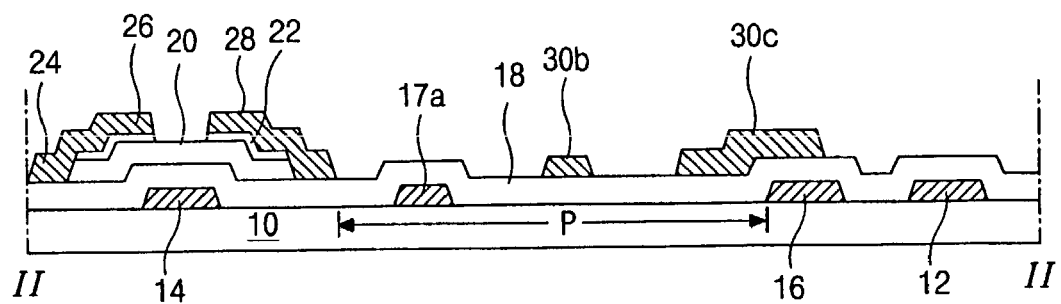
Figure 2C:
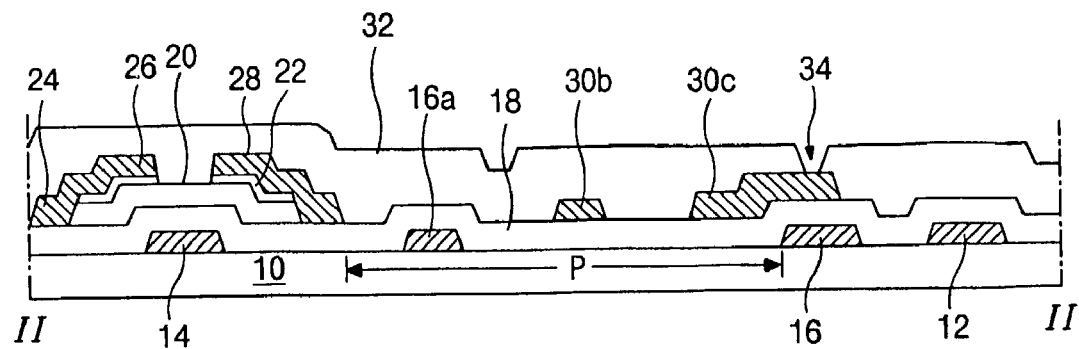
Figure 2D:
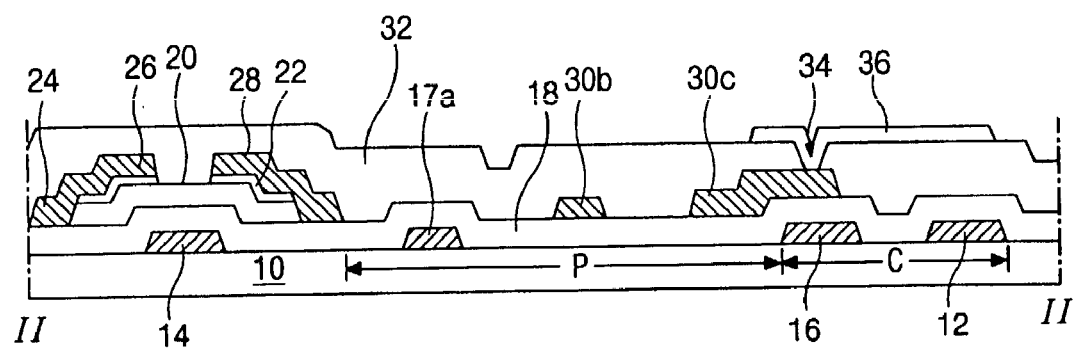

In an embodiment of the present invention, the TFT characteristics can be obtained by measuring current through the exposed pixel electrode. Furthermore, the storage capacitor "C" is composed of the gate line 112 and the common line as the first storage electrode, and the horizontal portion 130c as the second storage electrode without an additional electrode. Therefore, the fifth mask process for the transparent electrode of FIG. 2D can be omitted and the number of mask process is reduced.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
   a substrate;
   a gate line on the substrate;
   a common line on the substrate, the common line being parallel to and spaced apart from the gate line;
   a common electrode on the substrate, the common electrode including: a plurality of first vertical portions perpendicularly extended from the common line; and a first horizontal portion combining the plurality of first vertical portions;
   a gate insulating layer on the gate line, the common line and the common electrode;
   a data line on the gate insulating layer, wherein two of the plurality of first vertical portions of the common electrode adjacent the data line overlap the data line;
   a thin film transistor connected to the gate line and the data line, the thin film transistor including an active layer, source and drain electrodes;
   a pixel electrode directly on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and an adjacent gate line, wherein there is a non-overlapping space between the first vertical portions of the common electrode adjacent the data line and the second vertical portions of the pixel electrode adjacent the first vertical portions adjacent the data line; and
   a single passivation layer covering only the thin film transistor, wherein the extended portion, the plurality of second vertical portions and the second horizontal portion of the pixel electrode are exposed.

2. The substrate according to claim 1, wherein a dielectric constant of the gate insulating layer is less than about 3.

3. The substrate according to claim 2, wherein the gate insulating layer includes one of an organic insulating material group including benzocyclobutene (BCB), acrylic resin and photo resin.

4. The substrate according to claim 1, wherein the gate line has the same layer and the same material as the common line.

5. The substrate according to claim 4, wherein the gate line and the common line have one of conductive metal group including aluminum, aluminum alloy, tungsten, molybdenum and chromium.

6. The substrate according to claim 1, wherein the gate line and the common line, and the second horizontal portion compose a storage capacitor with the gate insulating layer interposed between the gate line and the common line, and the second horizontal portion.

7. The substrate according to claim 1, further comprising an ohmic contact layer formed on the active layer.

8. A fabricating method of an array substrate for an in-plane switching mode liquid crystal display device, comprising:
    forming a gate line on a substrate;
    forming a common line on the substrate, the common line being parallel to and spaced apart from the gate line;
    forming a common electrode on the substrate, the common electrode including: a plurality of first vertical portions perpendicularly extended from the common line; and a first horizontal portion combining the plurality of first vertical portions;
    forming a gate insulating layer on the gate line, the common line and the common electrode;
    forming a data line on the gate insulating layer, wherein two of the plurality of first vertical portions of the common electrode adjacent the data line overlap the data line;
    forming a thin film transistor connected to the gate line and the data line, the thin film transistor including an active layer, source and drain electrodes;
    forming a pixel electrode directly on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and an adjacent gate line, wherein there is a non-overlapping space between the first vertical portions of the common electrode adjacent the data line and the second vertical portions of the pixel electrode adjacent the first vertical portions adjacent the data line; and
    forming a single passivation layer that covers only the thin film transistor, wherein the extended portion, the plurality of second vertical portions and the second horizontal portion of the pixel electrode are exposed.

9. The method according to claim 8, wherein a dielectric constant of the gate insulating layer is less than about 3.

10. The method according to claim 9, wherein the gate insulating layer includes one of an organic insulating material group including benzocyclobutene (BCB), acrylic resin and photo resin.

11. The method according to claim 8, wherein the gate line has the same layer and the same material as the common line.

12. The method according to claim 11, wherein the gate line and the common line have one of conductive metal group including aluminum, aluminum alloy, tungsten, molybdenum and chromium.

13. The method according to claim 8, further comprising forming an ohmic contact layer on the active layer.

14. The method according to claim 13, wherein the active layer and the ohmic contact layer are formed through a mask process.

15. The method according to claim 14, further comprising exposing the active layer through etching the ohmic contact layer.

16. An array substrate for an in-plane switching mode liquid crystal display device, comprising:
    a substrate;
    a gate line on the substrate;
    a common line on the substrate, the common line being parallel to and spaced apart from the gate line;
    a common electrode on the substrate, the common electrode including: a plurality of first vertical portions perpendicularly extended from the common line; and a first horizontal portion combining the plurality of first vertical portions;
    a gate insulating layer on the gate line, the common line and the common electrode;
    a data line on the gate insulating layer, wherein two of the plurality of first vertical portions of the common electrode adjacent the data line overlap the data line;
    a thin film transistor connected to the gate line and the data line, the thin film transistor including an active layer, source and drain electrodes;
    a pixel electrode directly on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and an adjacent gate line, wherein there is a non-overlapping space between the first vertical portions of the common electrode adjacent the data line and the second vertical portions of the pixel electrode adjacent the first vertical portions adjacent the data line; and
    a passivation layer covering the thin film transistor, wherein the extended portion, the plurality of second vertical portions and the second horizontal portion of the pixel electrode are exposed, wherein the passivation layer is on the data line.

17. A fabricating method of an array substrate for an in-plane switching mode liquid crystal display device, comprising:
    forming a gate line on a substrate;
    forming a common line on the substrate, the common line being parallel to and spaced apart from the gate line;
    forming a common electrode on the substrate, the common electrode including: a plurality of first vertical portions perpendicularly extended from the common line; and a first horizontal portion combining the plurality of first vertical portions;
    forming a gate insulating layer on the gate line, the common line and the common electrode;
    forming a data line on the gate insulating layer, wherein two of the plurality of first vertical portions of the common electrode adjacent the data line overlap the data line;
    forming a thin film transistor connected to the gate line and the data line, the thin film transistor including an active layer, source and drain electrodes;

forming a pixel electrode directly on the gate insulating layer, the pixel electrode including: an extended portion extended from the drain electrode; a plurality of second vertical portions perpendicularly extended from the extended portion; and a second horizontal portion combining the plurality of second vertical portions and overlapping the common line and an adjacent gate line, wherein there is a non-overlapping space between the first vertical portions of the common electrode adjacent the data line and the second vertical portions of the pixel electrode adjacent the first vertical portions adjacent the data line; and forming a passivation layer that covers the thin film transistor, wherein the extended portion, the plurality of second vertical portions and the second horizontal portion of the pixel electrode are exposed and wherein the passivation layer is formed on the data line.

* * * * *